United States Patent
Pan et al.

(10) Patent No.: US 9,109,171 B2
(45) Date of Patent: Aug. 18, 2015

(54) SYSTEM AND METHOD FOR GASIFICATION AND COOLING SYNGAS

(71) Applicant: General Electric Company, Schenectady, NY (US)

(72) Inventors: Edward Chen Pan, Houston, TX (US); Ronnie Ranee Price, Kingwood, TX (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 14/081,329

(22) Filed: Nov. 15, 2013

(65) Prior Publication Data

US 2015/0137040 A1 May 21, 2015

(51) Int. Cl.
- C10J 3/74 (2006.01)
- C10J 3/20 (2006.01)
- C10J 3/76 (2006.01)
- C01B 3/02 (2006.01)

(52) U.S. Cl.
CPC ... C10J 3/76 (2013.01); C01B 3/02 (2013.01); C10J 2200/09 (2013.01)

(58) Field of Classification Search
CPC ............. C10J 3/74; C10J 3/76; C10J 2200/09
See application file for complete search history.

(56) References Cited

U.S. PATENT DOCUMENTS

| | | | |
|---|---|---|---|
| 2,928,730 A | 3/1960 | Luerssen | |
| 4,377,132 A * | 3/1983 | Koog et al. | 122/7 R |
| 4,481,014 A | 11/1984 | Dorling | |
| 4,569,680 A | 2/1986 | Darling et al. | |
| 4,678,480 A | 7/1987 | Heinrich et al. | |
| 4,841,917 A | 6/1989 | Premel | |
| 4,876,987 A | 10/1989 | Martin et al. | |
| 5,019,356 A * | 5/1991 | Silberring | 422/629 |
| 5,454,692 A | 10/1995 | Davis | |
| 5,632,933 A | 5/1997 | Yeoman et al. | |
| 5,713,312 A | 2/1998 | Waryasz | |
| 5,722,353 A | 3/1998 | Phelps | |
| 5,934,227 A | 8/1999 | Phelps | |
| 6,613,111 B2 | 9/2003 | Paisley | |
| 6,960,234 B2 | 11/2005 | Hassett | |
| 7,730,616 B2 | 6/2010 | Goller et al. | |
| 7,749,290 B2 | 7/2010 | Wallace | |
| 7,846,226 B2 | 12/2010 | Leininger et al. | |
| 8,083,817 B2 | 12/2011 | Kirchhubel et al. | |

(Continued)

FOREIGN PATENT DOCUMENTS

| | | |
|---|---|---|
| CN | 101438119 A | 5/2009 |
| WO | 9110106 A1 | 7/1991 |

Primary Examiner — Matthew Merkling
(74) Attorney, Agent, or Firm — Fletcher Yoder, P.C.

(57) ABSTRACT

A system includes an integrated gasification vessel including an enclosure including a first section and a second section that may enclose a gasifier, one or more injectors circumferentially disposed within the gasifier. The one or more injectors may supply the gasifier with a fuel. The system also includes a syngas cooler disposed within an annulus of the gasification vessel. The syngas cooler includes a shell that may flow a coolant and the syngas cooler includes a plurality of tubes surrounding the gasifier and that may flow a syngas from the gasifier. The system further includes a reinforcement system configured to reinforce at least a portion of the enclosure and the gasifier. The reinforcement system may include one or more reinforcement beams disposed within the annulus and that may couple the enclosure and the gasifier.

19 Claims, 5 Drawing Sheets

(56) References Cited

U.S. PATENT DOCUMENTS

| | | |
|---|---|---|
| 8,764,860 B2 * | 7/2014 | Avagliano et al. ............ 48/61 |
| 8,769,964 B2 | 7/2014 | Thacker |
| 2007/0186473 A1 | 8/2007 | Wallace |
| 2008/0034657 A1 | 2/2008 | Van Den Berg et al. |
| 2008/0166278 A1 | 7/2008 | Goller et al. |
| 2008/0172941 A1 | 7/2008 | Jancker et al. |
| 2008/0175769 A1 | 7/2008 | Goller et al. |
| 2008/0175770 A1 | 7/2008 | Wallace |
| 2009/0047193 A1 | 2/2009 | Corry et al. |
| 2009/0074638 A1 | 3/2009 | Harned et al. |
| 2009/0166975 A1 | 7/2009 | Russell et al. |
| 2009/0173484 A1 | 7/2009 | Storey et al. |
| 2009/0199474 A1 | 8/2009 | Leininger et al. |
| 2009/0274594 A1 | 11/2009 | Guo et al. |
| 2010/0031570 A1 | 2/2010 | Chen et al. |
| 2010/0088959 A1 | 4/2010 | Meyer et al. |
| 2011/0034709 A1 * | 2/2011 | Conneway et al. ........... 549/518 |

* cited by examiner

SYSTEM AND METHOD FOR GASIFICATION AND COOLING SYNGAS

BACKGROUND

The subject matter disclosed herein relates to gasification systems and, more particularly, to systems for cooling syngas.

Gasifiers convert carbonaceous materials into a mixture of carbon monoxide and hydrogen, referred to as synthesis gas or syngas. For example, an integrated gasification combined cycle (IGCC) power plant includes one or more gasifiers that react a feedstock at a high temperature with oxygen and/or steam to produce syngas. The syngas may be used for power generation, chemical production, or any other suitable application. Prior to use, the syngas may be cooled in a syngas cooler and treated in a gas treatment system.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an integrated gasification vessel including an enclosure including a first section and a second section that may enclose a gasifier, one or more injectors circumferentially disposed within the gasifier. The one or more injectors may supply the gasifier with a fuel. The system also includes a syngas cooler disposed within an annulus of the gasification vessel. The syngas cooler includes a shell that may flow a coolant and the syngas cooler includes a plurality of tubes surrounding the gasifier and that may flow a syngas from the gasifier. The system further includes a reinforcement system configured to reinforce at least a portion of the enclosure and the gasifier. The reinforcement system may include one or more reinforcement beams disposed within the annulus and that may couple the enclosure and the gasifier.

In a second embodiment, a system includes a vessel including a first wall with a first thickness and includes a first section and a second section. The first section is separate from the second section. The system also includes a gasifier disposed within the bottom section and that may gasify a fuel to generate a syngas. The gasifier is surrounded by a protective barrier including a second wall with a second thickness. The system also includes one or more injectors disposed radially and circumferentially about the vessel that may supply a fuel to the gasifier and a syngas cooler disposed within an annulus of the second section that may cool the syngas. The annulus is between the first wall and the second wall and surrounds the gasifier. The system further includes one or more beams with a third thickness disposed within the annulus and that may couple the first wall and the second wall.

In a third embodiment, a method includes supplying a fuel to an integrated gasification vessel that includes a housing having a first section and a double wall annulus section. The double wall annulus section includes one or more reinforcement beams that may couple the housing with a gasifier disposed within the integrated gasification vessel. The method also includes gasifying the fuel at a first temperature in the gasifier in a first stage of the integrated gasification vessel and adding additional fuel to the gasifier in a second stage of the integrated gasification vessel downstream of the first stage such that the fuel within the second stage is gasified at a second temperature. One or more injectors radially and circumferentially disposed about the second stage of the integrated gasification vessel provide the additional fuel. The method further includes routing the syngas in a third stage of the integrated gasification vessel to a syngas cooler disposed within the double wall annulus section. Routing the syngas includes flowing the syngas in a second flow direction in the double wall annulus that is generally opposite a first flow direction of the syngas in the gasifier. The method also further includes separating particulates generated during gasification of the fuel within the first and second stages of the integrated gasification vessel and cooling the syngas in the syngas cooler in a fourth stage of the integrated gasification vessel.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
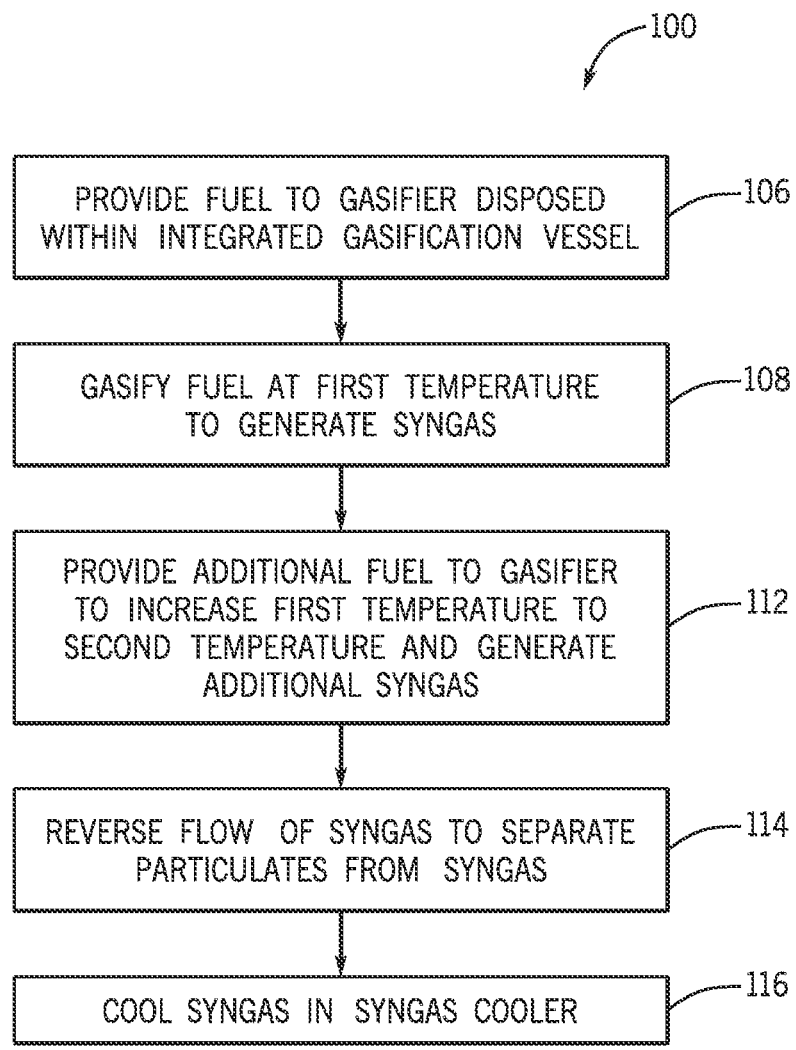
FIG. 1 is a block diagram depicting an embodiment of a method of generating and cooling a syngas.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include an integrated vessel including a gasifier and a convective syngas cooler. For example, the integrated vessel may include a gasifier disposed in a gasification vessel to convert a feedstock (e.g., a carbonaceous fuel) into a syngas and a convective syngas cooler in an interior of the gasification vessel that cools the syngas with a coolant. In certain embodiments, the convective syngas cooler may be disposed about and coaxial with a reaction chamber of the gasifier, i.e., in a concentric arrangement. Additionally, the convective syngas cooler may include an inner wall that may coincide with an outer wall of the reaction chamber, and may include an outer wall that may coincide with an inner wall of the gasification vessel. Furthermore, the integrated vessel may include one or more fuel spray bars (e.g. injectors) at various locations axially and circumferentially about the reaction chamber to supply additional fuel to the gasifier and increase gasification efficiency. The one or more fuel spray bars may increase the gasification efficiency by causing an increase in temperature within the reaction chamber at least in the vicinity of the one or more fuel spray bars. This increase in temperature may facilitate gasification reactions and maximize the amount of syngas generated from the fuel.

Incorporating the convective syngas cooler in the interior of the gasification vessel may provide more efficient processing of the resultant syngas and reduce operability costs. Moreover, the integrated vessel may reduce the quantity of construction materials (e.g., structural steel and/or concrete) used to support the gasification vessel, because of a decrease in height and weight, as well as eliminate a transfer line, which would otherwise be present between the gasification vessel and the convective syngas cooler. In addition, coolers that may be associated with the fuel spray bar may not be used due to the integration of the convective syngas cooler within the gasification vessel. Furthermore, the integrated vessel may reduce the overall volume occupied in a plant as compared to a separate gasification vessel and convective syngas cooler. Even further, the integrated vessel may result in a shorter construction cycle.

With the foregoing in mind, turning now to FIG. 1, a method 100 that utilizes an integrated gasifier and convective syngas cooler (CSC) vessel, to generate and cool a syngas generated by gasification of a fuel source is illustrated. The method 100 includes providing the fuel source to a gasifier within the integrated gasifier and CSC vessel (block 106). The fuel source may include coal, petroleum coke, biomass, wood-based materials, agricultural wastes, tars, coke oven gas, asphalt, heavy residues from a refinery, or other carbon containing items. The fuel source may be resized or reshaped by chopping, milling, shredding, pulverizing, briquetting, or pelletizing to generate a feedstock prior to entering the gasifier. In certain embodiments, the feedstock may be added to the gasifier as a dry feedstock. In other embodiments, a liquid (e.g., water) may be added to the feedstock to generate a slurry.

The method 100 also includes gasifying the fuel source in the gasifier within a first stage of the integrated gasifier and CSC vessel to generate a syngas at a first temperature (block 108). While in the gasifier, the fuel source is partially oxidized. As part of the partial oxidation, the fuel source may be heated to undergo a pyrolysis process. According to certain embodiments, temperatures inside the gasifier may range from approximately 150° C. to 700° C. during the pyrolysis process, depending on the type of fuel source utilized. The heating of the fuel source during the pyrolysis process may generate a solid (e.g., char) and residue gases (e.g., carbon monoxide (CO) and hydrogen ($H_2$)).

Before, during, or after addition of the fuel source to the gasifier, one or more gasifying agents may be added to the gasifier. Addition of the gasifying agents to the gasifier may help the fuel source to undergo a partial oxidation process. The gasifying agents may include air, nitrogen ($N_2$), carbon dioxide ($CO_2$), oxygen ($O_2$), steam, or a combination thereof. The char (carbon) and residue gases may react with the gasifying agents to form $CO_2$ and CO, which provide heat for any subsequent gasification reactions. According to certain embodiments, temperatures during the partial oxidation process may range from approximately 700° C. to 1600° C. In this way, the gasifier manufactures a syngas. The syngas may include approximately 85% of CO and $H_2$ in equal proportions, as well as $CH_4$, HCl, HF, COS, $NH_3$, HCN, and $H_2S$ (based on the sulfur content of the fuel source). The syngas may be termed untreated syngas, because it includes, for example $H_2S$.

The syngas generated in the gasifier during the first stage may be mixed with un-reacted fuel. Accordingly, the method 100 further includes adding an additional fuel source and gasifying agents to the gasifier in a second stage of the integrated gasifier and CSC vessel to gasify the fuel source at a second temperature (block 112). By adding additional fuel source to the gasifier in the second stage, the second temperature of the gasifier may be up to approximately 50 percent higher than the first temperature. For example, the second temperature of the gasifier may be approximately 1 to 50, 1 to 40, 1 to 30, 1 to 20, 1 to 10, or 1 to 5 percent more than the first temperature of the gasifier. As such, any fuel source that may have been un-reacted during the first stage may be partially oxidized in the second stage due to the increased temperature and additional gasifying agents. As such, the efficiency of the integrated gasifier may be increased. Moreover, the gasification of the additional fuel source within the second stage may provide heat for subsequent gasification reactions to produce additional syngas, as will be described in more detail below.

After gasification of the fuel source in the first stage and second stage, a flow of the syngas is reversed and gasification by-products (e.g., particulates, slag, ash) may separate from the syngas (block 114). Reversing the flow of the syngas in a direction generally opposite a flow direction of the syngas within the first and second stages of the integrated gasifier and CSC vessel (e.g., in an upward direction) may facilitate removal of gasification by-products due to gravity. The particulates may have a higher density compared to the syngas, and thereby drop down into a sump or lock hopper of the gasification vessel as the flow of the syngas is reversed upon exiting the gasifier. This may minimize the amount of particulates within the syngas that may interfere in processing of the syngas downstream of the gasifier (e.g., cooling the syngas in the syngas cooler).

The method 100 also includes cooling the syngas (block 116). After redirecting the syngas in an upward direction, the syngas may enter a syngas cooler (e.g., a convective syngas cooler (CSC)) within the integrated gasifier and CSC vessel. By integrating the syngas cooler into the integrated gasification vessel, the gasification efficiency of the gasifier and the cooling efficiency of the syngas cooler may be increased. For example, the syngas cooler may cool the gasifier during operation. As such, the gasifier may operate at higher temperatures compared to a non-integrated gasification vessel (e.g., a gasification vessel without a syngas cooler). Moreover, by placing the syngas cooler around to the gasifier (e.g., in a concentric arrangement), a flow direction of the syngas may be reversed (e.g., in a flow direction generally opposite a flow direction of the syngas in the gasifier) so that the syngas may enter the syngas cooler. Reversing the flow direction of the syngas may facilitate removal of gasification by-products (e.g., particulates, slag, ash etc.) that may cause fouling of heat transfer surfaces or obstruction of tubing configured to flow the syngas through the CSC. For example, as the syngas flows in an upward direction into the syngas cooler, the heavier gasification by-products may separate out of the syngas due to gravity. These gasification by-products may fall into a sump or lock hopper located at a bottom end of the gasifier rather than entering the syngas cooler. Accordingly, the cooling efficiency of the syngas cooler may be increased.

Figure 2:
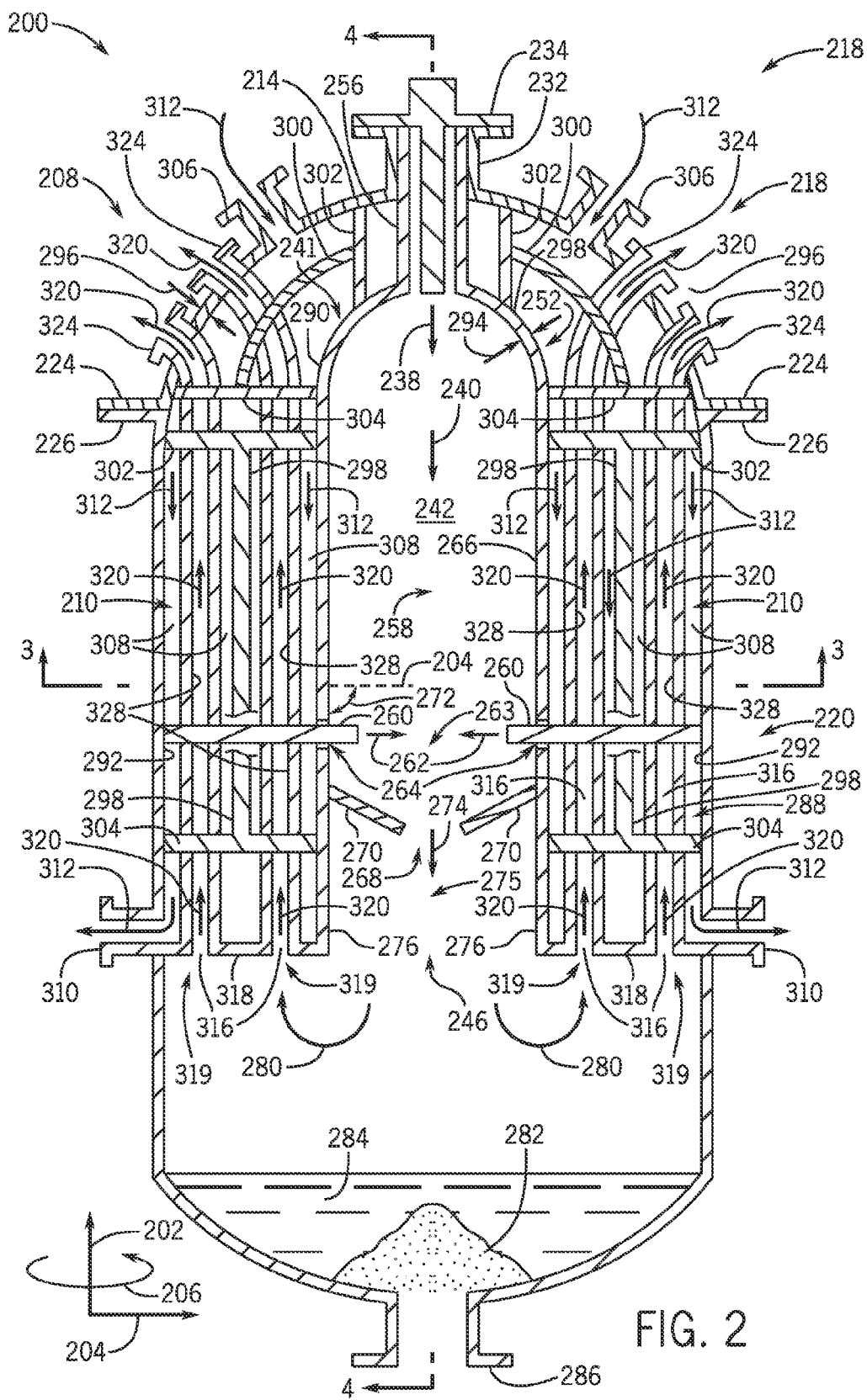
FIG. 2 is a cross-sectional side view of an embodiment of an integrated gasification vessel including a gasifier and a syngas cooler.

Present embodiments include an integrated gasification and convective syngas cooler (CSC) vessel configured to perform the steps of the method 100. FIG. 2 is a cross-sectional side view of an embodiment of an integrated gasifier and convective syngas cooler (CSC) vessel 200 for use with a gasification system, such as an integrated gasification combined cycle (IGCC) system. The integrated gasifier and CSC vessel 200 may have an axial axis or direction 202, a radial axis or direction 204 away from axis 202, and a circumferential axis or direction 206 around axis 202. As noted above, the integrated gasifier and CSC vessel 200 includes a gasification vessel 208 and a CSC 210 in a coaxial or concentric arrangement. The integrated gasifier and CSC vessel 200 includes an enclosure 214, also referred to as a shell (e.g., an annular shell), that functions as a housing or outer casing for the gasification vessel 208 (e.g., an annular vessel). As will be described in more detail below, the CSC 210 is also disposed in the enclosure 214. The enclosure 214 includes a top end portion 218 (e.g., an upper annular shell portion) and a bottom end portion 220 (e.g., a lower annular shell portion), such that the gasification vessel 208 and the CSC 210 are in a single, integrated vessel. In certain embodiments, the top end portion 218 may be a separate structure from the bottom end portion 220 and may be removable. In other words, the top end portion 218 may function as a removable lid for the gasification vessel 208. The top end portion 218 and the bottom end portion 220 may include a top flange 224 and a bottom flange 226, respectively, that couple the top end portion 218 and the bottom end portion 226. In certain embodiments, the top flange 224 and the bottom flange 226 may be disposed about a circumference of the gasification vessel 208 along the circumferential axis 206. In other embodiments, the top flange 224 and the bottom flange 226 may only be on a portion of the circumference of the gasification vessel 208. In such an embodiment, the top flange 224 aligns with the bottom flange 226 when the top end portion 218 and the bottom end portion 220 are coupled to each other. In one embodiment, after coupling the top end portion 218 and the bottom end portion 220, the top flange 224 and the bottom flange 226 may be secured to each other by welding, or any other suitable fasteners or coupling. In other embodiments, bolts, clamps, or any other suitable device or mechanism, may be used to secure the top flange 224 with the bottom flange 226. In certain embodiments, an interface between the top end portion 218 and the bottom end portion 220 may include a groove configured to house a seal (e.g., an O-ring) that may reduce or block leakage of gasification components (e.g., the syngas) from the gasification vessel 208 during operation of the integrated gasifier and CSC vessel 200.

The top end portion 218 may also include features that facilitate coupling of the gasification vessel 208 to a fuel source used to generate a syngas. For example, the top end portion 218 may include an inlet 232 (e.g., an axial port at the apex of the top end portion 218) configured to receive an injector 234 that supplies the gasification vessel 208 with a fuel, as indicated by arrow 238, according to the steps of block 106 of the method 100. The fuel 238 may include coal, petroleum coke, biomass, wood-based materials, agricultural wastes, tars, coke oven gas, asphalt heavy residues from a refinery, or other suitable carbon containing items.

The gasification vessel 208 further includes a gasifier and/or a combustor 241 that is configured to partially oxidize the fuel source 238 and an oxidizer to generate a syngas, as indicated by arrow 240, according to the steps of block 108 of the method 100. For example, the gasification vessel 208 may include a reaction chamber 242 and a quench chamber 246. A protective barrier 248 may define the reaction chamber 242. The protective barrier 248 may act as a physical barrier, a thermal barrier, a chemical barrier, or any combination thereof. Examples of materials that may be used for the protective barrier 248 include, but are not limited to, refractory materials, refractory metals, non-metallic materials, clays, ceramics, cements, and oxides of aluminum, silicon, magnesium, and calcium. In addition, the materials used for the protective barrier 248 may be bricks, castable, coatings, or any other suitable material, or combination thereof. Furthermore, in certain embodiments the protective barrier 248 may include a cooling wall or a surface wetting film for additional vessel protection.

In the illustrated embodiment, an upper portion 252 of the reaction chamber 242 is positioned within the top end portion 218. However, in other embodiments, the upper portion 252 may only be within the bottom end portion 220 of the integrated gasification vessel 208 (e.g., below the bottom flange 226) such that the reaction chamber 242 is housed only within the bottom end portion 220. The gasifier 241 within the gasification vessel 208 may be an updraft or downdraft fixed-bed gasifier, a fluidized-bed gasifier, such as a bubbling fluidized-bed gasifier or a circulating fluidized-bed gasifier, or moving bed gasifier. During a gasification process, the fuel source 238 may undergo a pyrolysis process, whereby the fuel 238 is heated. Temperatures inside the reaction chamber 242 may range from approximately 150 degrees C. to 700 degrees C. during the pyrolysis process, depending on the fuel source 238 utilized.

The reaction chamber 242 (e.g., annular chamber) may include a passage 256 (e.g., an axial port) configured to couple the injector 234 to the reaction chamber 242. The passage 256 may direct the fuel 238, along with an oxidant and optional moderator, into a first stage 258 of the reaction chamber 242. Accordingly, pyrolysis, partial oxidation/combustion, gasification, or a combination thereof, may occur inside the reaction chamber 242, as described above. Volatiles generated during the pyrolysis process, also known as devolatilization, may be partially combusted by introducing an oxidant to the reaction chamber 242. The volatiles may react with the oxidant to form $CO_2$ and CO in partial oxidation reactions, which provide heat for the subsequent gasification reactions. In this way, the gasification vessel 208 manufactures the syngas 240.

In addition to providing the reaction chamber 242 with the fuel 238 via the injector 234, the reaction chamber 242 may also receive gasification components (e.g., the fuel 238, the oxidizer (e.g., gasifying agents), or a combination thereof) from one or more spray bars 260, e.g., an after burner or fuel injector, disposed radially (e.g., radial axis 204) and circumferentially (e.g., circumferential axis 206) about the gasification vessel 208, according to the steps of block 112. For example, the one or more spray bars 260 may provide additional fuel, as indicated by arrow 262, to the reaction chamber 242 during gasification of the fuel source 238. This may drive gasification reactions within a second stage 263 of the reaction chamber 242 and may increase gasification efficiency of the gasification vessel 208, as will be described in further detail below. The one or more spray bars 260 may be placed at discrete locations along any portion of the reaction chamber 242 (e.g., in the first stage 258 and the second stage 263), such that the one or more spray bars 260 may introduce the additional fuel 262, gasifying agents, or a combination thereof, at any stage of the gasification process. The reaction chamber 242 may include one or more openings 264 circumferentially disposed on a side wall 266 (e.g., annular side wall) that facilitate insertion of the one or more spray bars 260 into the reaction chamber 242. In the illustrated embodiment, the one or more spray bars 242 are located near a bottom opening 268 (e.g., a bottom annular opening) defined by a throat 270 in the second stage 263 of the integrated gasifier and CSC vessel 200 (e.g., an area between the one or more spray bars 260 and the bottom opening 268).

The additional fuel 262 from the one or more spray bars 260 may cause an increase in the temperature of the reaction chamber 242 (e.g., in the first stage 258 or the second stage 263 of the gasification vessel 208 depending on placement of the one or more spray bars 260), and therefore increase the gasification efficiency of the reaction chamber 242 by facilitating production of the syngas 240. Increasing the temperature of the reaction chamber 242 in the second stage 263 of the integrated gasifier and CSC vessel 200 may result in an increase in the production of the syngas 240 within the reaction chamber 242. For example, $CO_2$ and $H_2O$ generated from the partial oxidation of the fuel 238 in the first stage 258 of the reaction chamber 242 may pass through, or otherwise contact gasification by-products (e.g., char or ash) and undergo a reduction reaction to generate additional CO and $H_2$ (e.g., syngas 240). However, the reduction reaction that is performed to produce the additional CO and $H_2$ is endothermic, and therefore uses heat. The bulk of the reduction reaction may therefore use heat produced by the partial oxidation of the additional fuel 262 in the second stage 263 of the reaction chamber 242, and may also use any latent heat from the hot char or ash generated in the first stage 258 of the integrated gasifier and CSC vessel 200. In essence, the reaction chamber 242 utilizes the additional fuel 262 to produce CO and released energy, which drives the reduction reactions in the second stage 263 of the integrated gasifier and CSC vessel 200 and converts any un-reacted fuel source 238 from the first stage 258 into $CO_2$ and $H_2$, increasing the amount of syngas 240 generated in the reaction chamber 242. Moreover, increasing the temperature of the reaction chamber 242 in area between the one or more spray bars 260 and the bottom opening 268 (e.g., in the second stage 263 of the integrated gasifier and CSC vessel 200) may allow the first stage 258 of the integrated gasifier and CSC vessel 200 (e.g., area between the upper portion 252 and the one or more spray bars 260) to operate at temperatures that are up to approximately 25% less than the temperature in the second stage 263 of the integrated gasifier and CSC vessel 200.

The one or more spray bars 260 may be positioned at an angle 272 relative to the radial axis 204. For example, the one or more spray bars 260 may be angled downwardly (e.g., towards the bottom opening 268) or upwardly (e.g., towards the upper portion 252) approximately 1 to 90, 1 to 50, 1 to 30, or 1 to 20 degrees relative to the radial axis 204. In other embodiments, the one or more spray bars 260 may not be angled. As such, the one or more spray bars 260 may be positioned orthogonal to a direction of a flow of the syngas 240 within the reaction chamber 242 (e.g., relative to the longitudinal axis 202).

The high-temperature, high-pressure untreated syngas (e.g., syngas 240) produced in the reaction chamber 242 may exit through the bottom opening 268, as illustrated by arrow 274. In certain embodiments, the syngas 240 from the reaction chamber 242 may enter the quench chamber 246 (e.g., a third stage 275 of the integrated gasifier and CSC vessel 200). While in the quench chamber 246, the syngas 240 may be partially quenched. The quench chamber 246 may also function to reduce the temperature of the syngas 240. For example, the quench chamber 246 may quench the syngas 240 to a temperature that is above the condensation temperature of entrained gas phase molecules and below the softening point of ash (e.g., between approximately 800 and 950 degrees C.). In other embodiments, the gasification vessel 208 may not include the quench chamber 246. In such embodiments, the syngas 240 from the reaction chamber 242 may flow out through the bottom opening 268 and into a syngas cooler (e.g., CSC 210 or a radiant syngas cooler) for further processing within the gasification vessel 208.

A protective barrier 276 may define the quench chamber 246. Similar to the protective barrier 248, the protective barrier 276 may act as a physical barrier, a thermal barrier, a chemical barrier, or any combination thereof, and may be constructed from refractory materials, refractory metals, non-metallic materials, clays, ceramics, cement, bricks, castable, coatings, and oxides of aluminum, silicon, magnesium, and calcium, or any combination thereof. The protective barrier 276 may also include a cooling wall or a surface wetting film for additional vessel protection.

The protective barrier 276 may also function to direct the syngas 242 exiting the quench chamber 246 in an upward direction (e.g., counter-current to a flow direction of the syngas 240 within the reaction chamber 242) and into the CSC 210, as illustrated by arrows 280, according to the steps of block 114. This redirection may facilitate the removal of solids 282 generated during gasification, such as slag, particulate matter, or ash, from the syngas 240 by causing the solids 282 to drop out of the flow of the syngas 240. The solids 282 that are separated from the upward flow of syngas 240 may be collected in a sump 284 or a lock hopper disposed at the bottom end portion 220 of the enclosure 214. In certain embodiments, the sump 284 may be filled with water or one or more chemicals to facilitate cooling of the solids 282 for easier removal through a solids outlet 286. In addition to facilitating the removal of the solids 282 from the syngas, the redirection (e.g., in an upward direction) allows the syngas 240 to flow into the CSC 210.

As noted above, the integrated gasifier and CSC 200 includes the CSC 210 (e.g., a fourth stage 288 of the gasification vessel 208), that performs the steps of block 116 of method 100. The CSC 210 is disposed in the enclosure 214 of the gasification vessel 208 and creates a double wall annulus section within the gasification vessel 208. In the illustrated embodiment, the CSC 210 is disposed between an exterior wall 290 (e.g., annular wall) of the gasifier 241 and an interior wall 292 (e.g., annular wall) of the enclosure 214. The CSC 210 may surround at least a portion of the reaction chamber 242 and the quench chamber 246. In one embodiment, the CSC 210 may only surround the reaction chamber 242. As illustrated in FIG. 2, the CSC 210 is in an annular configuration and is coaxial with the reaction chamber 242 and the quench chamber 246, i.e., a concentric arrangement of the CSC 210 circumferentially around the gasification vessel 208. Furthermore, in certain embodiments, an inner wall (e.g., annular wall) of the CSC 210 may coincide with the outer wall 290 of the gasifier 241. Additionally, the CSC 210 may include an outer wall (e.g., annular wall), which may coincide with the inner wall 292 of the enclosure 214.

By incorporating the CSC 210 within the gasification vessel 208, surrounding the reaction chamber 242, a first wall thickness 294 of the protective barriers 248 and 276 and a second wall thickness 296 of the enclosure 214 may be thinner compared to a wall thickness of a protective barrier and an enclosure of a non-integrated gasification vessel (e.g., a gasification vessel that does not include the CSC 210). For example, the CSC 210 may cool the protective barrier 248 and 276, and therefore the protective barriers 248 and 276 may not include a cooling wall. As such, the protective barriers 248 and 276 may have a thinner wall. Moreover, due to the cooling of the reaction chamber 242 by the CSC 210, heat loss within the reaction chamber 242 may be reduced. As such, the wall thickness 294 of the protective barriers 248 and 276 may be decreased compared to a non-integrated gasification vessel (e.g., without the CSC 210). In certain embodiments, the first and second wall thicknesses 294 and 296 may be decreased by approximately 1 to 60, 1 to 40, 1 to 20, or 1 to 10 percent compared to a wall thickness of a protective barrier and an enclosure of a non-integrated gasification vessel. This decrease in wall thickness may also decrease the overall weight of the gasification vessel 208 due to the use of less materials (e.g., steel or concrete) to form the protective barriers, 248 and 276, and the enclosure 214.

The gasification vessel 208 may include a plurality of reinforcement beams 298 and 300 (e.g., I-beams) circumferentially disposed about a portion of the gasification vessel 208. The plurality of reinforcement beams 298 may be disposed in the bottom end portion 220 within the double wall annulus section between the enclosure 214 and the reaction chamber 242. Similarly, the plurality of reinforcement beams 300 may be disposed within the double wall annulus of the top end portion 218 between the enclosure 214 and the upper portion 252 of the reaction chamber 242. The plurality of reinforcement beams 300 may be configured to conform to the top end portion 218. That is, the plurality of reinforcement beams 300 may have a non-linear shape (e.g., curved, bent, arched, etc). The plurality of reinforcement beams 298 and 300 may include a first insert 302 and a second insert 304 that each attach to the outer wall 290 and the inner wall 292. The plurality of reinforcement beams 298 and 300 may provide reinforcement to the walls of the enclosure 214 and the reaction chamber 242, as will be discussed in further detail below with reference to FIG. 3. In this way, the gasification vessel 208 may have a smaller radial cross-section (e.g., width), because the wall thicknesses 294 and 296 may be thinner compared to a non-integrated gasification vessel, due to the incorporation of the plurality of reinforcement beams 298 and 300. For example, the plurality of reinforcement beams 298 and 300 within the double wall annular section may provide a link between the enclosure 214 and the reaction chamber 242. That is, the plurality of reinforcement beams 298 and 300 may bridge the outer wall 290 of the gasifier 241 and the inner wall 292 of the enclosure 214, thus reinforcing the enclosure 214 and the reaction chamber 242. As such, the enclosure 214, the protective barriers 248 and 276, and the reinforcement beams 298 and 300 may form a reinforcement system for the integrated gasifier and CSC vessel 200. A portion of the reinforcement system may have an overall thickness equal to at least the sum of the first thickness 294, the second thickness 296 and an internal width (e.g., internal diameter) of the double wall annulus. Therefore, the reinforcement system may allow for less material to be used in manufacturing the integrated gasifier and CSC vessel 208, and the overall weight of the integrated gasifier and CSC vessel 208 may be decreased. This integrated design of the integrated gasifier and CSC vessel 200 may reduce the construction and commissioning costs as compared to a system having a gasifier separate from (e.g., vertically stacked with) the syngas cooler (e.g., CSC 210). For example, the integrated gasifier and CSC vessel 200 may occupy a smaller footprint in the IGCC, because the integrated design may not have the additional length of the CSC 210. Additionally, the integrated gasifier and CSC vessel 200 may be manufactured without a heavy wall transfer line utilized to transfer the feed from a gasifier to a syngas cooler, thus reducing capital cost, as well as avoiding the operating and availability problems associated with transferring the feed from unit to unit.

In certain embodiments, positioning the CSC 214 about the reaction chamber 242 and/or the quench chamber 246 (e.g., in a conical or concentric arrangement along circumferential axis 206) may provide the benefit of cooling the reaction chamber 242, the quench chamber 246, and the one or more spray bars 260. For example, the CSC 210 may replace a cooling layer of the protective barriers 248 and 276, and therefore decrease the wall thickness 294 of the protective barriers 248 and 276. Furthermore, the reduction in temperature to the reaction chamber 242, caused by the coolant within the CSC 210, may allow the protective barrier 248 to be constructed from less expensive refractory materials that would generally be less suitable for containing the hot syngas (e.g., syngas 240). In other embodiments, the gasifier 241 may not include the protective barriers 248 and 276. As a result of incorporating the CSC 210, the gasification vessel 208 (with the refractory protective barrier 248) may receive a dry fuel 238, which may cause an increase in operating temperatures, in addition to an advantageous increase in cold gas efficiency, as compared to a liquid fuel source (e.g., a slurry). The reduction in temperature in the reaction chamber 242 may also reduce the use of one or more moderators in the first stage 258 or second stage 263 reactions. Even further, utilizing a dry fuel 238 to operate at a higher temperature may reduce the overall reaction time (e.g., residence time in the reaction chamber 242), and the reaction chamber 242 may be constructed with a smaller diameter and/or length due to the reduction in reaction time. Thus, the CSC 210 that is disposed about the reaction chamber 242 and/or the quench chamber 246 (e.g., in a coaxial or concentric arrangement) may increase the overall efficiency and decrease the overall cost of the gasification vessel 208. In addition, because the CSC 210 may be integrated into the gasification vessel 208, the integrated gasifier and CSC vessel 200 may not include cooling features associated with the one or more spray bars 260, as the CSC 210 may facilitate cooling of the one or more spray bars 260.

In general, the CSC 210 cools the syngas via heat exchange with a coolant. In certain embodiments, the CSC 210 may function as a heat exchanger, such as a shell-and-tube heat exchanger. For example, the syngas may flow through one or more tubes and a coolant may flow through the shell. Alternatively, the syngas may flow through the shell and the coolant may flow through one or more tubes. As illustrated in FIG. 2, the integrated gasifier and CSC vessel 200 may receive a coolant through an inlet 306 disposed on the top end portion 218. The inlet 306 may route the coolant through a shell 308 of the CSC 210 to an outlet 310, as illustrated by arrow 312. The coolant may be any suitable fluid for cooling the syngas 240, such as boiler feedwater, water from a steam drum, cryogens (e.g., liquid nitrogen), or thermal fluids (e.g., ethylene glycol, propylene glycol, and derivatives thereof). In certain embodiments, the CSC 210 may also include a plurality of tubes 316 surrounded by the shell 308. As illustrated in FIG. 2, each tube 316 is configured to receive the syngas 240, after it has been redirected in the upward direction 280. The plurality of tubes 316 may route the syngas 240 through the CSC 210, as indicated by arrows 320, to the top end portion 218 of the gasification vessel 208, where it may exit through one or more outlets 324 for further processing (e.g., purification). In the illustrated embodiment, the plurality of tubes 316 form a non-linear (e.g., curved, bent, arched, etc.) pathway to facilitate coupling of the plurality of tubes 316 with the one or more outlets 324. For example, the plurality of tubes 316 may be off-axis (e.g., from axis 202) near or at the top end portion 218. However, in other embodiments, the plurality of tubes 316 may form a linear pathway (e.g., along axis 202) depending on the location of the one or more outlets 324 in the top end portion 218.

While in the CSC 210, the syngas 240 flowing through the plurality of tubes 316, as indicated by arrows 320, may be cooled via the coolant flowing through the shell 308. In certain embodiments, the flow of the coolant may be co-current with the flow of the syngas 240 flowing through the plurality of tubes 316. Alternatively, the coolant may flow counter-current to the syngas 240 flowing through the plurality of tubes 316, as indicated by arrow 312. Additionally, as the syngas 240 travels through the plurality of tubes 316, the heat from the syngas 240 may cause the coolant passing through the shell 308 to vaporize, thereby producing steam, such as high-pressure steam. The steam, which exits via the outlet 310, may be used as a source of heat elsewhere in the IGCC. For example, the steam may be used as an input to a heat recovery steam generator (HRSG), a gas purifier system, a polygen system, a carbon capture system, a methanation system, a vapor absorption system, a process heat exchanger, a reactor, an attemperator, or any combination thereof of the IGCC. Accordingly, the integrated gasifier and CSC vessel 200 advantageously cools the syngas 240 and produces large quantities of high-pressure steam, which may have numerous applications for power generation.

A seal 318 (e.g., an annular seal) may be circumferentially disposed (e.g., along axis 206) in the bottom end portion 220 to keep the coolant from flowing into the sump 284. For example, the seal 318 may be disposed within the double wall annulus section and may be coupled to the outer wall 290 of the gasifier 241 and the inner wall 292 near the outlet 310. In the illustrated embodiment, the seal 318 is in-line with a portion of the outlet 310 and an end of the quench chamber 246. In this particular embodiment, the seal 318 may be integrated with the quench chamber 246, forming a radial extension (e.g., along axis 204) of the quench chamber 246. However, the seal 318 may also be disposed at any position below the outlet 310. For example, in embodiments where the quench chamber 246 terminates below the outlet 310 (e.g., extends past (e.g., along the axis 202) the outlet 310 towards the sump 284). As such, the seal 318 may be coupled to any portion of the outer wall 290 and the inner wall 292 that is below the outlet 310. The seal 318 may include one or more openings 319 to facilitate insertion of the plurality of tubes. The seal 318 may be constructed from refractory materials, metals, non-metallic materials, clays, ceramics, cements, or any other suitable material.

As discussed above, the syngas 240 flows into the CSC 210 through the plurality of tubes 316. Routing the flow of the syngas 240 upwardly (e.g., towards the top end portion 218) through the plurality of tubes 316 may reduce obstruction of the plurality of tubes 316 that may be caused by the solids 282 (e.g., slag, ash, etc.). For example, as the syngas 240 flows upwardly into the CSC 210, as indicated by arrow 280, the solids 282 may separate from the syngas 240 due to gravity. As such, there may be a decrease in the amount of solids 282 flowing into the CSC 210. This may reduce the amount of deposits (e.g., solids 282) that may accumulate and obstruct the plurality of tubes 316. Similarly, fouling of heat transfer surfaces (e.g., an inner wall surface 328 of the plurality of tubes 316) may be decreased due to less deposition of the solids 282 on of the inner wall 328. Consequently, the cooling efficiency of the CSC 210 may be increased.

Figure 3:
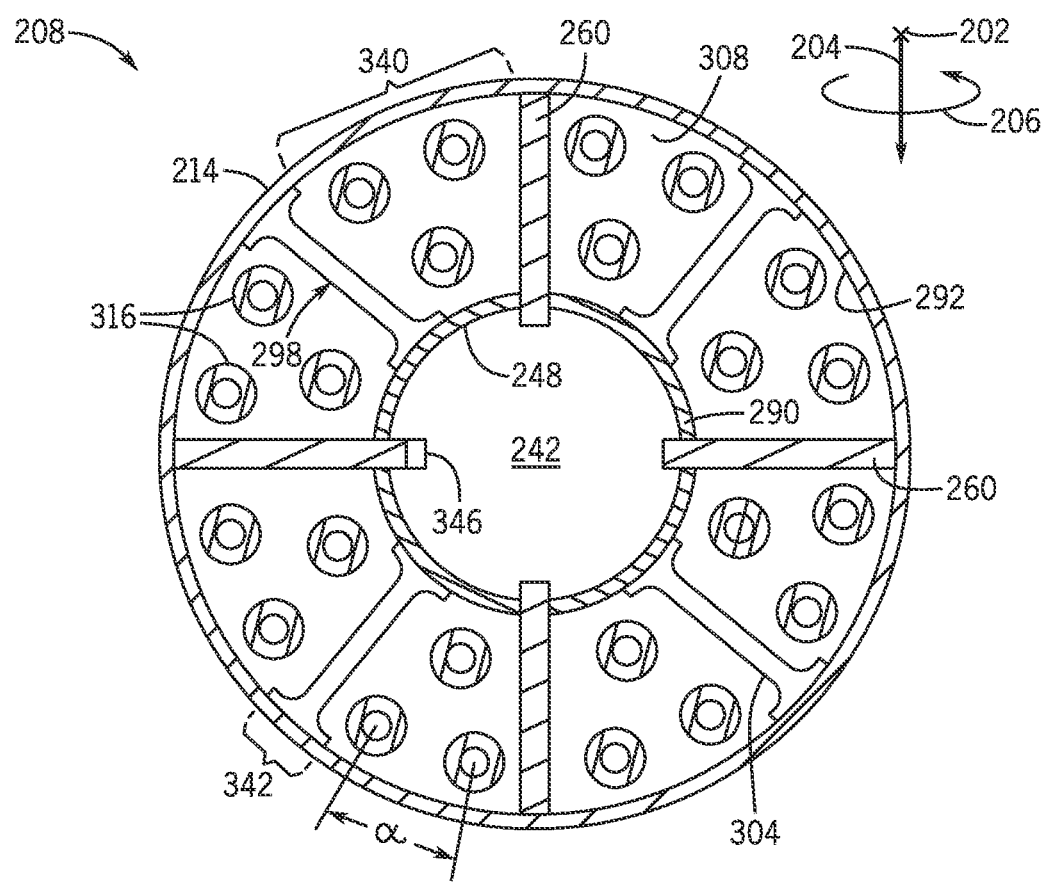
FIG. 3 is a radial cross-sectional view of an embodiment of the integrated gasification vessel of FIG. 2 taken along line 3-3.

The cooling efficiency of the CSC 210 may be influenced by the arrangement and size of the plurality of tubes 316. Turning now to FIG. 3, a radial cross-section of the gasification vessel 208 taken along line 3-3 of FIG. 2 is illustrated. In the illustrated embodiment, the plurality of tubes 316 have an annular cross-section, however the plurality of tubes 316 may have any other suitable shape (e.g., triangular, rectangular, square, etc.). As discussed above, the coolant within the CSC 210 flows through the shell 308 and around the plurality of tubes 316. As such, to facilitate cooling of the plurality tubes 316, and consequently cooling of the syngas 240, it may be advantageous to increase the amount of surface area of the plurality of tubes 316 in contact with the coolant flowing through the shell 308. This may be achieved by arranging the plurality of tubes 316 at discrete locations within the double wall annulus section of the gasification vessel 208 (e.g., between the reaction chamber 242 and the enclosure 214). For example, in one embodiment, the plurality of tubes 316 may be arranged in annular rows around at least a portion of the reaction chamber 242 and may be spaced apart by a distance d, measured from center to center of each tube 316. As should be appreciated, the distance d between each tube 316 within each annular row may increase radially towards the enclosure 214. That is, the distance d between each tube 316 in an annular row adjacent to the enclosure 214 may be larger than the distance d between each tube 316 in an annular row adjacent to the reaction chamber 242. In certain embodiments, the plurality of tubing 316 may be arranged in groups or clusters 340 separated by the one or more spray bars 260, the plurality of reinforcement beams 298, or a combination thereof. A distance between each cluster may be determined by a width 342 of the plurality of reinforcement beams 298. As should be appreciated, the arrangement of the plurality of tubes 316 may also be influenced by the plurality of reinforcement beams 300 (e.g., in the top end portion 218).

In addition to arranging the plurality of tubes 316 to increase the amount of surface area in contact with the coolant, the arrangement of each tube 316 may be influenced by placement of the one or more spray bars 260 within the gasification vessel 208. As discussed above, with reference to FIG. 2, the one or more spray bars 260 are positioned radially (e.g., along radial axis 204) and circumferentially (e.g., about circumferential axis 206) around the gasification vessel 208. Therefore, the one or more spray bars 260 may be positioned in a space between the plurality of tubes 316. Accordingly, the distance d between each tube 316 may be determined by the size and shape of the one or more spray bars 260. In one embodiment, the distance d between each tube 316 (e.g., adjacent tubes) in each annular row may be equal to or greater than a width 346 of the one or more spray bars 260. In other embodiments, the distance d may be equal to or greater than the width 342 of the plurality of reinforcement beams 298. In another embodiment, the distance d between each tube 316 (e.g., adjacent tubes) may vary within a single annular row (e.g., along circumferential axis 206). For example, a distance between each tube 316 directly adjacent to the one or more spray bars 260 or the plurality of reinforcement beams 298 may be greater than the distance d between each tube 316 (e.g., adjacent tube) that is not directly adjacent to the one or more spray bars 260 within each annular row.

Figure 4:
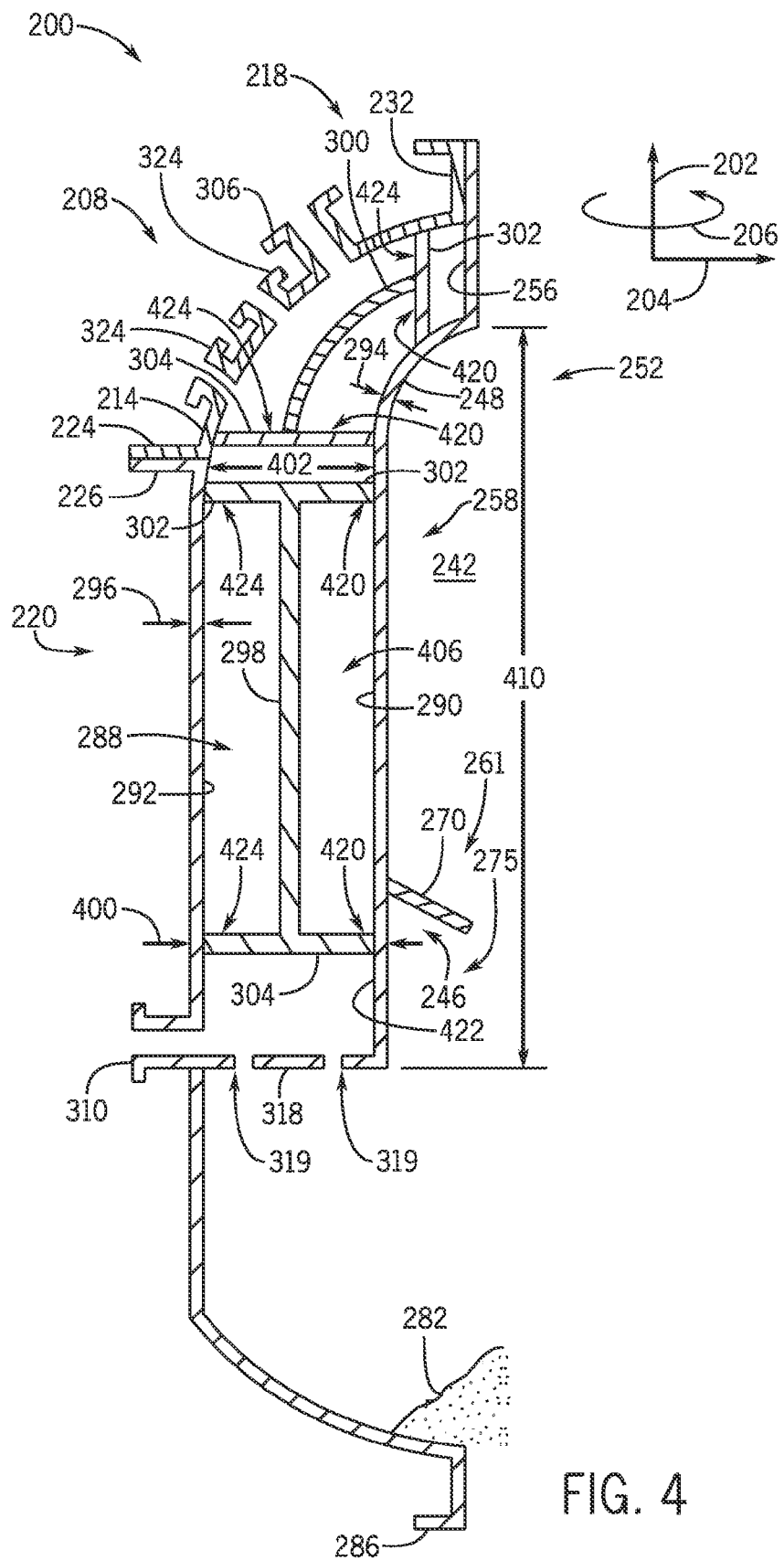
FIG. 4 is a partial cross-sectional side view of an embodiment of the integrated gasification vessel of FIG. 2 taken along line 4-4.

As discussed above, the gasification vessel 208 includes the plurality of reinforcement beams 298 and 300 in between the reaction chamber 242 and the enclosure 214 (e.g., within the double wall annulus section). The plurality of reinforcement beams 298 and 300 reinforce the walls of the enclosure 214 and reaction chamber 242, such that deformation of the gasification vessel 208 that may be caused by the high pressures generated during gasification of the fuel source 240 may be reduced. Turning now to FIG. 4, a cross-sectional view of the integrated gasifier and CSC vessel 200 of FIG. 2 is illustrated, taken along line 4-4. To facilitate discussion of FIG. 4, certain features of the gasification vessel 208 have been omitted (e.g., the one or more spray bars 260 and the plurality of tubes 316). In the illustrated embodiment, the plurality of reinforcement beams 298 and 300 provide a link between the reaction chamber 242 and the enclosure 214 (e.g., connects the reaction chamber 242 and the enclosure 214). Accordingly, the enclosure 214 and the reaction chamber 242 may be reinforced by the plurality of reinforcement beams 298 and 300. Consequently, the reaction chamber 242 may have an overall thickness 400 that is at least equal to approximately the sum of the first wall thickness 294, the second wall thickness 296, and a width 402 of an annulus 406 of the integrated gasifier and CSC vessel 200, at least in the portions of the reaction chamber 242 where the first insert portion 302 and the second insert portion 304 are attached.

Generally, gasification vessels have thick walls to mitigate deformation of the gasification vessel due to the high pressures generated during gasification of the fuel source. In the integrated gasification and CSC vessel 200, the first thickness 294 of the reaction chamber 242 is decreased due to the annulus 406 created by the incorporation of the CSC 210 between the enclosure 214 and the reaction chamber 242. The high pressures generated during gasification of the fuel 238 within the reaction chamber 242 may cause deformations in the protective barrier 248 (e.g., walls of the reaction chamber 242). However, by incorporating the plurality of reinforcement beams 298 and 300 into the annulus 406, the enclosure 214 and the reaction chamber 242 may be coupled to each other. This may reinforce the protective barrier 248 of the reaction chamber 242. For example, a portion of the reaction chamber 242 may have the overall thickness 400 in areas of the gasification vessel 208 where the first and second insert portions 302 and 304, respectively, of the plurality of reinforcement beams 298 and 300 couple the enclosure 214 and the reaction chamber 242, rather than the thickness 294. By reinforcing a portion of the reaction chamber 242 with the plurality of reinforcement beams 298 and 300 (e.g., at the location of the first and second insert portions 302 and 304, respectively), the reaction chamber 242 may resist the high pressures generated during the gasification of the fuel 238. In addition, the gasification vessel 208 may operate at pressures higher than those generally used for gasification (e.g., pressures higher than approximately 85 bar). These higher pressures may increase the gasification efficiency of the reaction chamber 242.

The plurality of reinforcement beams 298 extend axially (e.g., on longitudinal axis 202) along at least a portion of a length 410 of the reaction chamber 242 and quench chamber 246. In one embodiment, a first side 420 of the first insert portion 302 and the second insert portion 304 of the plurality of reinforcement beams 298 may be coupled to a portion the outer wall 290 of the gasifier 241 and a portion of an outer wall 422 of the quench chamber 246, respectively. A second side 424 of the first insert portion 302 and the second insert portion 304 may be coupled to a portion of the inner wall 292 of the enclosure 214 (e.g., in the bottom end portion 220). In other embodiments, the first side 420 of the first and second insert portions 302 and 304, respectively, may only be coupled to the outer wall 290 of the gasifier 241. Similarly, the first side 420 of the first insert portion 302 and the second insert portion 304 of the plurality of reinforcement beams 300 may be coupled the outer wall 290 of the upper portion 252 of the gasifier 241. Additionally, the second side 424 of the first insert portion 302 and the second insert portion 304 may be coupled to the inner wall 292 of the enclosure 214 at the top end portion 218. The first and second insert portions 302 and 304, respectively, may be secured onto the outer wall 290 of the gasifier 241 and the inner wall 292 of the enclosure 214 by any suitable fastener or coupling, such as but not limited to, welding or machining. In certain embodiments, the insert portions 302 and 304 may be secured onto the outer wall 290 and the inner wall 292 by a pair of connectors, as described below.

Figure 5:
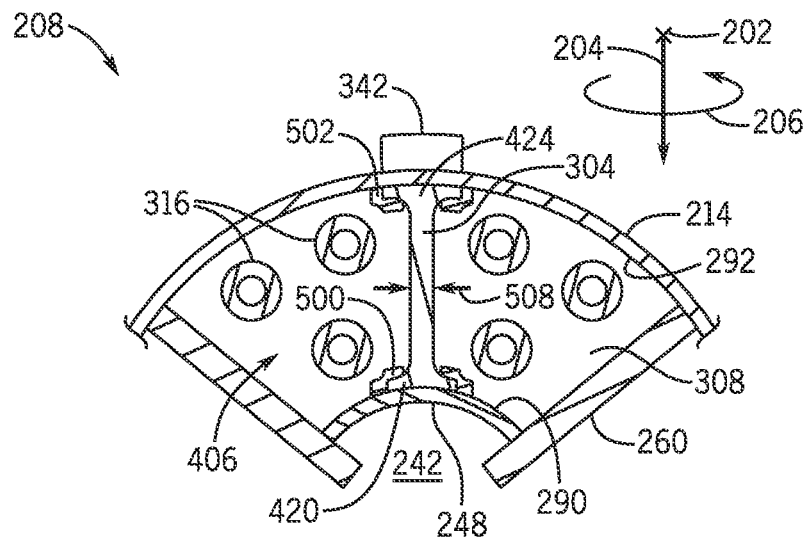
FIG. 5 is a portion of a radial cross-sectional view of an embodiment of the integrated gasification vessel of FIG. 4.

FIG. 5. illustrates the second insert portion 304 secured within the annulus 406 by connectors 500 and 502. To facilitate discussion of FIG. 5, reference will only be made to the second insert portion 304 of the reinforcement beam 298. The connectors 500 and 502 may be affixed onto a portion of the outer wall 290 of the gasifier 241 and the inner wall 292 of the enclosure 214, respectively. In certain embodiments, the connectors 500 and 502 may be attached to the gasification vessel 208 by welding them onto a surface of the outer wall 290 and the inner wall 292. This may facilitate retrofitting gasification vessels with the plurality of reinforcement beams 298. In other embodiments, the connectors 500 and 502 may be machined onto a surface of the outer wall 290 and the inner wall 292, for example during manufacturing of the gasification vessel 208. However, as should be appreciated, the connectors 500 and 502 may be attached to the gasification vessel 208 via any other suitable method.

The connectors 500 and 502 are configured to receive the first side 420 and the second side 424, respectively, of the second insert portion 304. The connectors 500 and 502 are positioned directly across from each other (e.g., along radial axis 204), such that they are aligned with the second insert portion 304 when the plurality of reinforcement beams 298 are positioned within the annulus 406. As should be noted, the connectors 500 and 502 that secure the first insert portion 302 and the connectors 500 and 502 that secure the second insert portion 304 are axially positioned a distance equal to or less than the length of the plurality of reinforcement beams 298. Additional connectors 500 and 502 may be affixed to the gasification vessel 208 at several axial locations (e.g., along longitudinal axis 202). For example, in certain embodiments, the plurality of reinforcement beams 298 may include additional insert portions axially distributed between the first and second insert portions 302 and 304, respectively. The additional connectors 500 and 502 may provide support for the additional insert portions and may also serve as a guide for the second insert portion 304 when the plurality of reinforcement beams 298 are inserted into the annulus 406. The first and second insert portions 302 and 304, respectively, may each have a constant width or a variable width. For example, in the illustrated embodiment, the first side 420 and the second side 424 of the first insert portion 302 and the second insert portion 304 have the first width 342 that is wider than a second width 508 (e.g., center of the first insert portion 302 and the second insert portion 304) such that the first and second insert portions 302 and 304, respectively, have an I-shape. In other embodiments, the first width 342 and the second width 508 are equal such that the width of the first and second insert portions 302 and 304, respectively, (e.g., the first side 420, the second side 422, and the center of the insert portions 302 and 304) is constant along radial axis 204. The connectors 500 and 502 may have an opening approximately equal to the first width 342 to facilitate insertion of the first insert portion 302 and the second insert portion 304 into the connectors 500 and 502.

As described above, certain embodiments of the integrated gasifier and CSC vessel 200 may include the CSC 210 annularly surrounding the reaction chamber 242 of the gasification vessel 208 (e.g., in a concentric arrangement). The integrated configuration of the integrated gasifier and CSC vessel 200 may reduce the overall capital cost (e.g., construction costs and equipment footprint) as compared to a separate gasifier and CSC. Additionally, the integrated gasifier and CSC vessel 200 may include one or more spray bars 260 that supply the reaction chamber 242 with additional fuel 262 that may partially oxidize and increase the temperature of the gasifier. As such, the amount of syngas 240 generated may be increased, thus increasing the gasification efficiency of the reaction chamber 242. The integrated gasifier and CSC vessel 200 may also include the plurality of reinforcement beams 298 to couple the enclosure 214 and the protective barrier 248. This may increase a portion of the first wall thickness 294 of the reaction chamber 242 and a portion of the second wall thickness 296 of the enclosure 214, reducing deformation of the protective barrier 248 and the enclosure 214 that may be caused by the high pressures generated during gasification of the fuel 238. In certain embodiments, the integrated gasifier and CSC vessel 200 may include features configured to direct the syngas 240 through the CSC 210 to facilitate separation of particulates 282 from the syngas 240.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   an integrated gasification vessel, comprising:
   an enclosure comprising a first section and a second section configured to enclose a gasifier;
   one or more injectors circumferentially disposed within the gasifier, wherein the one or more injectors are configured to supply the gasifier with a fuel;
   a syngas cooler disposed within an annulus of the integrated gasification vessel, wherein the syngas cooler comprises a shell configured to flow a coolant, and the syngas cooler comprises a plurality of tubes surrounding the gasifier and configured to flow a syngas from the gasifier; and
   a reinforcement system configured to reinforce at least a portion of the enclosure and the gasifier, wherein the reinforcement system comprises one or more reinforcement beams disposed within the annulus and configured to couple the enclosure and the gasifier.

2. The system of claim 1, wherein the first section and the second section each comprise a flange configured to couple the first section with the second section.

3. The system of claim 1, wherein the one or more injectors are positioned generally orthogonal to a flow direction of the syngas within the gasifier.

4. The system of claim 1, comprising a protective barrier surrounding the gasifier.

5. The system of claim 1, wherein the one or more reinforcement beams are circumferentially disposed within the annulus and comprise a first insert portion and a second insert portion, wherein the first and second insert portions are configured to couple to a corresponding connector disposed on an interior wall of the enclosure and on an exterior wall of the gasifier.

6. The system of claim 1, wherein the annulus is disposed between an interior wall of the enclosure and an exterior wall of the gasifier.

7. The system of claim 1, comprising a protective barrier configured to direct a syngas flowing from the gasifier in a first flow direction into the syngas cooler, wherein the syngas flowing into the syngas cooler flows in a second flow direction generally opposite the first flow direction.

8. The system of claim 7, wherein the protective barrier surrounds a quench chamber of the gasifier.

9. The system of claim 1, comprising the gasifier, wherein a first portion of the gasifier is disposed within the first section of the enclosure and a second portion of the gasifier is disposed within the second section of the enclosure.

10. A system, comprising:
    a vessel comprising a first wall with a first thickness and comprising:
    a first section and a second section, wherein the first section is separate from the second section;
    a gasifier enclosed by the first and second sections, wherein the gasifier is disposed within the second section and configured to gasify a fuel source to generate a syngas, and wherein the gasifier is surrounded by a protective barrier having a second wall with a second thickness;
    one or more injectors disposed radially and circumferentially about the vessel and configured to supply a fuel to the gasifier;
    a syngas cooler comprising a plurality of tubes disposed within an annulus of the second section surrounding the gasifier, wherein the plurality of tubes is configured to flow the syngas from the gasifier and cool the syngas, wherein the annulus is between the first wall and the second wall; and
    one or more beams with a third thickness disposed within the annulus and configured to couple the first wall and the second wall.

11. The system of claim 10, wherein the second wall comprises one or more openings along a circumferential axis of the vessel.

12. The system of claim 11, wherein the one or more openings are configured to allow insertion of the one or more injectors into the gasifier.

13. The system of claim 10, wherein the protective barrier is configured to direct a first flow direction of the syngas to a second flow direction, wherein the second flow direction is generally opposite the first flow direction.

14. The system of claim 10, wherein the one or more beams comprise a first insert portion and a second insert portion, wherein the first and second insert portions are configured to couple to a corresponding connector disposed on the first wall and the second wall.

15. The system of claim 10, wherein the vessel has a fourth thickness is at least the sum of the first thickness, the second thickness, and the third thickness.

16. A method, comprising:
    supplying a fuel to an integrated gasification vessel comprising a housing having a first section and a double wall annulus section, wherein the double wall annulus section comprises one or more reinforcement beams configured to couple the housing with a gasifier disposed within the integrated gasification vessel;
    gasifying the fuel at a first temperature in the gasifier in a first stage of the integrated gasification vessel to generate a syngas;
    adding additional fuel to the gasifier in a second stage of the integrated gasification vessel downstream of the first stage such that the fuel within the second stage is gasified at a second temperature to generate additional syngas, wherein one or more injectors radially and circumferentially disposed about the second stage of the integrated gasification vessel provide the additional fuel;

routing the syngas in a third stage of the integrated gasification vessel to a syngas cooler disposed within the double wall annulus section, wherein routing the syngas comprises flowing the syngas in a second flow direction in the double wall annulus section that is generally opposite a first flow direction of the syngas in the gasifier;

separating particulates generated during gasification of the fuel within the first and second stages of the integrated gasification vessel; and cooling the syngas in the syngas cooler in a fourth stage of the integrated gasification vessel.

17. The method of claim 16, comprising flowing a coolant within the syngas cooler in a direction generally opposite a flow direction of the syngas within the gasifier, wherein the syngas cooler comprises a plurality of tubes surrounding the gasifier and configured to flow the syngas from the gasifier.

18. The method of claim 16, comprising quenching the syngas exiting the second stage of the gasification vessel in a quench chamber disposed within the third stage of the integrated gasification vessel.

19. The method of claim 16, wherein the one or more reinforcement beams are configured to increase a thickness of at least a portion of a wall of the gasifier by at least an internal width of the double wall annulus of the bottom section.

\* \* \* \* \*